(12) United States Patent
Athey

(10) Patent No.: US 10,487,755 B2
(45) Date of Patent: Nov. 26, 2019

(54) POWERTRAIN ARRANGEMENT, METHOD, AND DEDICATED MEASURING APPARATUS FOR USE WITH ADDITIZED DIMETHYL ETHER (DME) FUEL

(71) Applicants: VOLVO TRUCK CORPORATION, Göteborg (SE); Allison Athey, Greensboro, NC (US)

(72) Inventor: Allison Athey, Greensboro, NC (US)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/746,417

(22) PCT Filed: Sep. 11, 2015

(86) PCT No.: PCT/US2015/049725
§ 371 (c)(1),
(2) Date: Jan. 21, 2018

(87) PCT Pub. No.: WO2017/044123
PCT Pub. Date: Mar. 16, 2017

(65) Prior Publication Data
US 2018/0216542 A1 Aug. 2, 2018

(51) Int. Cl.
*F02D 19/02* (2006.01)
*F02M 21/02* (2006.01)
(Continued)

(52) U.S. Cl.
CPC ......... *F02D 19/027* (2013.01); *F02D 19/029* (2013.01); *F02D 41/0027* (2013.01);
(Continued)

(58) Field of Classification Search
CPC ........... F02M 21/0212; F02M 2200/95; F02M 2200/953; F02M 2200/956; F02D 19/027;
(Continued)

(56) References Cited

U.S. PATENT DOCUMENTS

| 4,989,570 A | * | 2/1991 | Kuribara | F02B 1/02 |
| | | | | 123/1 A |
| 5,060,619 A | * | 10/1991 | Sakurai | F02D 19/0628 |
| | | | | 123/1 A |

(Continued)

FOREIGN PATENT DOCUMENTS

| DE | 102009002740 A1 | 11/2010 |
| JP | 2006242121 A * | 9/2006 |

OTHER PUBLICATIONS

International Search Report (dated Dec. 10, 2015) for corresponding International App. PCT/US2015/049725.
(Continued)

*Primary Examiner* — Hai H Huynh
*Assistant Examiner* — Robert A Werner
(74) *Attorney, Agent, or Firm* — WRB-IP LLP

(57) ABSTRACT

A powertrain arrangement for use with additized Dimethyl Ether (DME) fuel, the additized DME comprising DME and a lubricity additive, is provided. The powertrain arrangement includes a powertrain comprising an engine adapted for use with the additized DME fuel, a fuel tank, a conductivity sensor in the fuel tank; the conductivity sensor being arranged to transmit a signal, corresponding to a conductivity of fuel in the fuel tank, a temperature sensor in the fuel tank, the temperature sensor being arranged to transmit a signal corresponding to a temperature of the fuel in the fuel tank, and a controller configured to receive and process the conductivity signal and the temperature signal and to send a control signal to control functioning of the powertrain in response to the conductivity signal and the temperature signal. A measuring apparatus and method are also provided.

15 Claims, 3 Drawing Sheets

(51) Int. Cl.
*F02D 41/00* (2006.01)
*F02M 25/06* (2016.01)

(52) U.S. Cl.
CPC ........ *F02M 21/0212* (2013.01); *F02M 25/06* (2013.01); *F02D 2200/0606* (2013.01); *F02D 2200/0611* (2013.01)

(58) Field of Classification Search
CPC .............. F02D 19/029; F02D 19/0647; F02D 2200/0606; F02D 2200/0611
USPC ........... 73/35.02, 114.38, 114.55; 123/406.3, 123/1 A, 198 D, 198 DB
See application file for complete search history.

(56) References Cited

U.S. PATENT DOCUMENTS

| | | | |
|---|---|---|---|
| 5,070,832 A | 12/1991 | Hapka et al. | |
| 2002/0029770 A1* | 3/2002 | Heffel | F02B 43/00 123/527 |
| 2003/0020494 A1 | 1/2003 | Desmier et al. | |
| 2003/0021329 A1 | 11/2003 | Lee et al. | |
| 2003/0213293 A1 | 11/2003 | Lee et al. | |
| 2005/0217638 A1 | 10/2005 | Kaneko | |
| 2007/0092770 A1* | 4/2007 | Obata | G01N 27/406 429/432 |
| 2010/0231371 A1 | 9/2010 | Arakawa et al. | |
| 2012/0014345 A1 | 6/2012 | Bogema et al. | |
| 2012/0143450 A1 | 6/2012 | Bogema et al. | |
| 2013/0019777 A1 | 8/2013 | Sloan et al. | |

OTHER PUBLICATIONS

Chapman et al. Annual Technical Progress Report for Project Entitled "Impact of DME-Diesel Fuel Blend Properties on Diesel Fuel Injection Systems". 2003, [retrieved on Nov. 2, 2015]. Retrieved from the Internet:URL: http://www.osti.gov/scitechlservlets/purl/821275 >.entire document.

European Official Action (dated Apr. 25, 2019) for corresponding European App. 15 903 750.6.

* cited by examiner

POWERTRAIN ARRANGEMENT, METHOD, AND DEDICATED MEASURING APPARATUS FOR USE WITH ADDITIZED DIMETHYL ETHER (DME) FUEL

BACKGROUND AND SUMMARY

The present invention relates generally to powertrains and methods for use with additized dimethyl ether (DME) fuel and, more particularly, to ensuring quality of DME fuel.

There has been substantial interest in recent years in vehicles, particularly trucks that run on dimethyl ether. This is a fuel with very different characteristics from diesel fuel and other hydrocarbon based fuels.

Due to, among other things, the lack of infrastructure for DME fuel, there are concerns with ensuring the fuel does not get contaminated with propane or other hydrocarbons along the supply chain. Propane and DME have similar physical characteristics. It is possible, for example, that consumers will try to put propane in their vehicles designed for use with DME if the price of propane is cheaper, or that a supplier would try to mix propane and DME for cost savings. It is also possible that a consumer who is not able to obtain DME conveniently might choose to use propane if it is more readily available.

There is also a concern that DME will lack the lubricity additive to permit an engine to properly function. DME lacks the natural lubricity needed to lubricate the fuel system components, so lubricity agents are added to the DME. As DME is a new fuel lacking strong infrastructure, there is not presently a good way to insure the fuel will be properly additized.

It is desirable to provide a method to detect both DME contamination with, among other things, hydrocarbon fuel, and to detect the proper additization of DME with a lubricity agent.

In accordance with an aspect of the present invention, a powertrain arrangement for use with additized Dimethyl Ether (DME) fuel, the additized DME comprising DME and a lubricity additive, is provided. The powertrain arrangement comprises a powertrain comprising an engine adapted for use with the additized DME fuel, a fuel tank, a conductivity sensor in the fuel tank, the conductivity sensor being arranged to transmit a signal corresponding to a conductivity of fuel in the fuel tank, a temperature sensor in the fuel tank, the temperature sensor being arranged to transmit a signal corresponding to a temperature of the fuel in the fuel tank, and a controller configured to receive and process the conductivity signal and the temperature signal and to send a control signal to control functioning of the powertrain in response to the conductivity signal and the temperature signal.

In accordance with another aspect of the present invention, an apparatus for measuring conductivity of additized Dimethyl Ether (DME) fuel, the additized DME comprising DME and a lubricity additive, is provided. The additized DME may include other additives, as well, such as an odorant and whatever else is deemed necessary. The apparatus comprises a conductivity sensor, the conductivity sensor being arranged to transmit a signal corresponding to a conductivity of fuel being measured, a temperature sensor, the temperature sensor being arranged to transmit a signal corresponding to a temperature of the fuel being measured, and a controller configured to receive and process the conductivity signal and the temperature signal and to send a signal in response to a determination that conductivity of the fuel being measured is outside of a predetermined range of conductivity for additized DME at the temperature of the fuel being measured.

In accordance with another aspect of the invention, a method of operating a powertrain arrangement for use with additized Dimethyl Ether (DME) fuel, the additized DME comprising DME and a lubricity additive, is provided. The method comprises sensing conductivity of fuel with a conductivity sensor, transmitting a signal corresponding to the conductivity of the fuel sensed by the conductivity sensor, sensing a temperature of the fuel with a temperature sensor, transmitting a signal corresponding to the temperature of the fuel sensed by the temperature sensor, and processing the conductivity signal and the temperature signal in a controller and sending via the controller a control signal to control functioning of a powertrain of the powertrain arrangement in response to the conductivity signal and the temperature signal.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
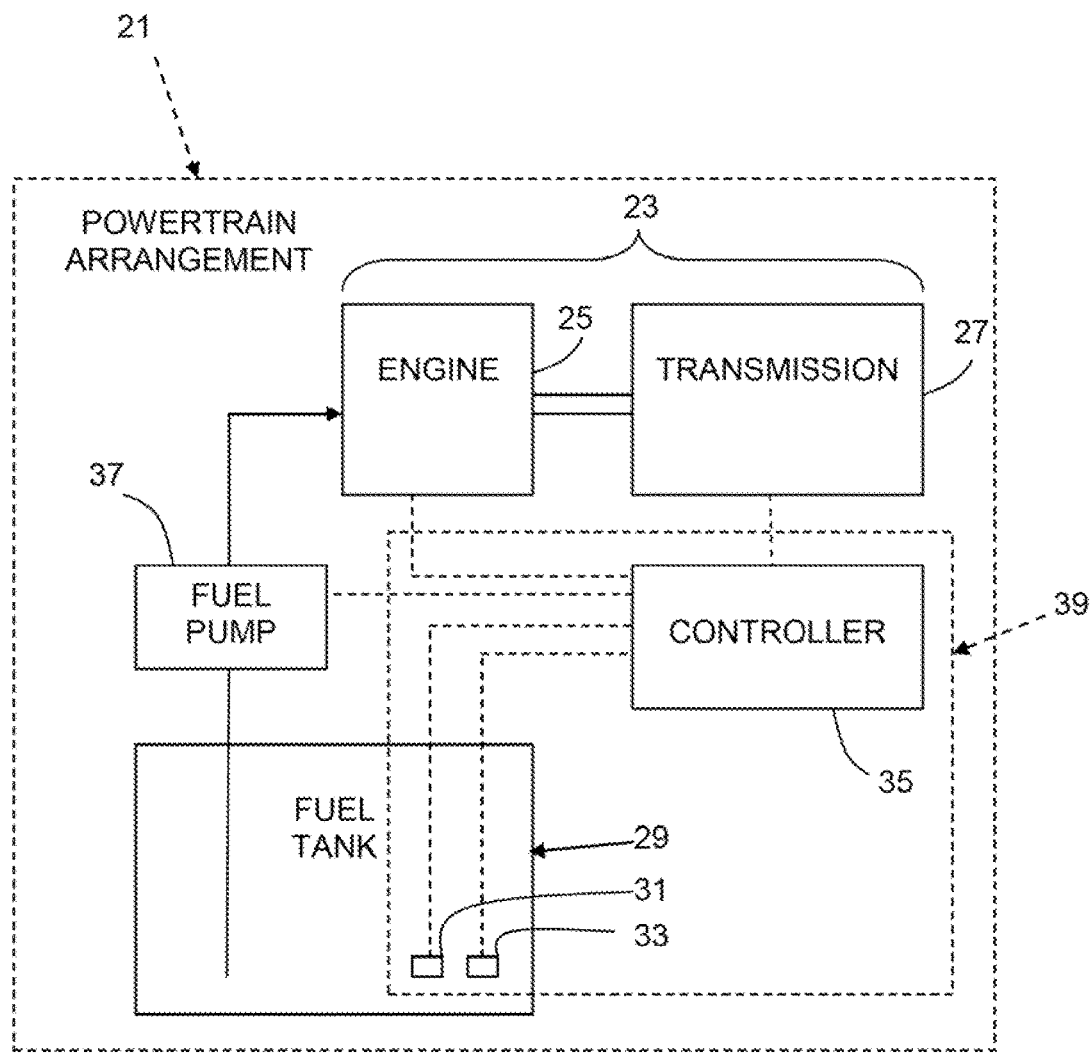
FIG. 1 is a schematic view of a powertrain according to an aspect of the present invention.

A powertrain arrangement 21 for use with additized DME fuel, the additized DME comprising DME, a lubricity additive, and any other additives that are considered to be appropriate, such as an odorant and a cleaner, is shown in FIG. 1. The powertrain arrangement 21 can be of a type that is typically used in a vehicle such as a truck. Such a powertrain arrangement 21 can include but is not limited to a powertrain 23 comprising an engine 25 adapted for use with the additized DME fuel, and a transmission 27. The powertrain arrangement 21 can further include a fuel tank 29, a conductivity sensor 31 in the fuel tank, the conductivity sensor being arranged to transmit a signal corresponding to a conductivity of fuel in the fuel tank, and a temperature sensor 33 in the fuel tank, the temperature sensor being arranged to transmit a signal corresponding to a temperature of the fuel in the fuel tank.

The powertrain arrangement 21 can further include a controller 35 configured to receive and process the conductivity signal and the temperature signal and to send a control signal to control functioning of the powertrain 23 in response to the conductivity signal and the temperature signal. More particularly, the controller 35 is configured to send a control signal to cause the powertrain 23 to function normally when the conductivity signal and the temperature signal reflect that the conductivity of the fuel in the fuel tank at the temperature of the fuel in the fuel tank is within a predetermined range.

The controller 35 is also configured to send a control signal to cause the powertrain 23 to at least one of derate and shut down when the conductivity signal and the temperature signal reflect that the conductivity of the fuel in the fuel tank at the temperature of the fuel in the fuel tank is outside of the predetermined range. The controller 35 can be configured to send different control signals as a function of an extent to which the conductivity of the fuel in the fuel tank at the temperature of the fuel in the fuel tank is outside of the predetermined range. The controller 35 can, for example, be configured to send a first control signal to send a warning to, e.g., an operator to check the fuel when the conductivity of the fuel in the fuel tank at the temperature of the fuel tank is within a first range outside of the predetermined range (e.g., between the "$1^{st}$ Warning Band" and the "$2^{nd}$ Warning Band" curves on FIG. 2), and to send a second control signal to cause the powertrain 23 to derate when the conductivity of the fuel in the fuel tank at the temperature of the fuel in the fuel tank is within a second range outside of the predetermined range (e.g., outside of the $2^{nd}$ Warning Band curves on FIG. 2). The controller 35 can also be configured to send a control signal to cause the powertrain to shut down when the conductivity of the fuel in the fuel tank at the temperature of the fuel in the fuel tank is outside of a further range (beyond the "$2^{nd}$ Warning Band" curves) (not shown in FIG. 2). Various techniques for derating or stopping the powertrain 23 are known, such as slowing or stopping operation of a fuel pump 37, altering operation of injectors (not shown), and altering timing of engine valves (not shown), or altering operation of the transmission 27. The powertrain 23 may be derated by limiting the engine speed, possibly to different speeds depending upon the nature or extent of the fault, or by stopping the engine. The particular manner of derating or stopping the power train will depend upon a number of factors. For example, if the fuel itself acts a lubricant for any hardware, such as for injector components, then a fuel pump would ordinarily only be slowed, and not stopped. Whether the pump is slowed or stopped may also depend upon whether the fuel supply and return circuit is a low-pressure circuit (which will typically have a mechanical-only pump) or high-pressure circuit (which may have a mechanical pump and/or a controllable, electric pump). Fueling demand, fuel pressure, exhaust gas recirculation usage, variable geometry turbine positions, etc., can be set to "safe" values so the vehicle can limp to a workshop. After it is determined that conductivity at a particular temperature is outside of the predetermined range or outside of the first range, additional tests can be performed to more specifically identify the nature of the contamination.

The predetermined range will be a range of conductivity at the temperature of the fuel corresponding to fuel of acceptable quality in terms of presence of a desired amount of lubricity additive, and the absence of excessive or insufficient lubricity additive, or the presence of water, propane, or other substances other than DME with a desired level of lubricity additive. What the expected conductivity of the DME with a desired level of lubricity additive will be at a given temperature depends upon the level and nature of the lubricity additive (and any other intended additives).

Figure 2:
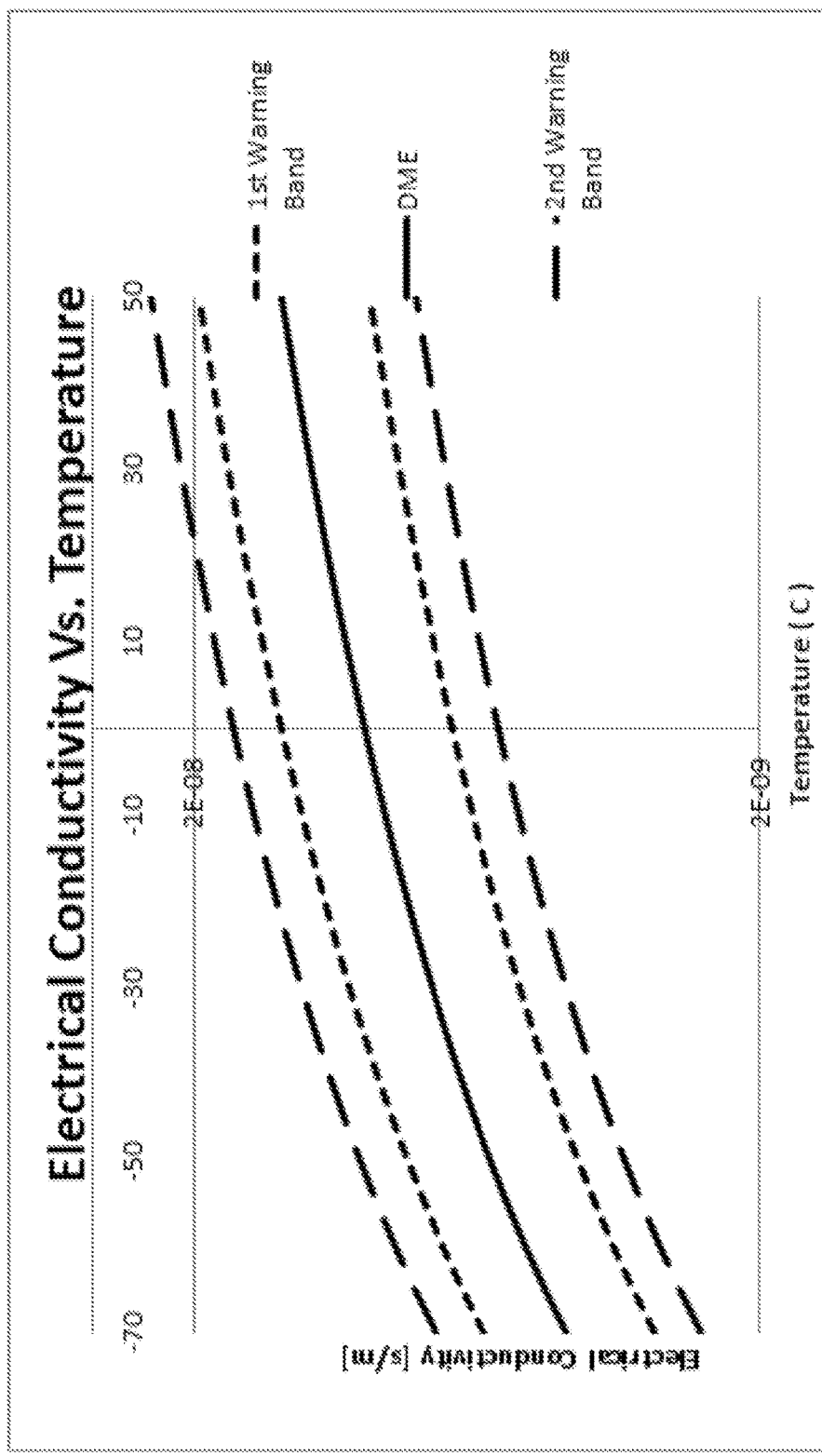
FIG. 2 is a graph of conductivity versus temperature for various substances including DME.

FIG. 2 shows, for purposes of illustration, a graph of conductivity of versus temperature for DME. The line "DME" is a graph of conductivity of DME over a range of temperatures. The graph of FIG. 2 is merely illustrative and it will be appreciated that an actual graph of conductivity might have a different shape than that illustrated. In general, the conductivity of DME increases with temperature.

Upper and lower normal levels of conductivity of additized DME above and below the DME curve are not shown in FIG. 2. Curves illustrating the conductivity of fuel at which a response such as checking the fuel is appropriate are shown in FIG. 2 as "$1^{st}$ Warning Band" on either side of the DME curve. Curves illustrating the conductivity of fuel at which a response such as derating the engine is appropriate are shown in FIG. 2 as "$2^{nd}$ Warning Band". Further curves can be provided to initiate some further response, such as shutting down of the engine, can also be provided. It will be appreciated that the curves shown are merely illustrative and are provided to demonstrate that conductivity of an additized fuel is anticipated to deviate from the value expected for DME without additives, but that, at some level of deviation, a warning or other measure such as derating or stopping of the engine can take place. The predetermined range of acceptable deviation of conductivity at a particular temperature of a particular fuel under consideration from the optimal conductivity of DME with the lubricity additive at that temperature will depend upon the specific application for which the fuel is intended to be used According to an aspect of the present invention seen in FIG. 1, a conductivity sensor 31, a temperature sensor 33, and a controller 35 can together define a dedicated apparatus 39 for measuring conductivity of additized Dimethyl Ether (DME) fuel, the additized DME comprising DME and a lubricity additive. In such a dedicated apparatus, the conductivity sensor 31 can be arranged to transmit a signal corresponding to a conductivity of fuel being measured, the temperature sensor can be arranged to transmit a signal corresponding to a temperature of the fuel being measured, and the controller can be configured to receive and process the conductivity signal and the temperature signal and to send a signal in response to a determination that conductivity of the fuel being measured is outside of a predetermined range of conductivity for additized DME at the temperature of the fuel being measured. The signal may be of a variety of suitable types, such as a visual, audible, or other alarm, or the closing or opening of a switch or switches that can be used, for example, as a control signal or part of a control signal to control functioning of the powertrain 23 of a powertrain arrangement 21. For example, closing (or opening) of a switch may disconnect or reduce power to a fuel pump, a fuel injector, alter valve timing, or modify operation of other equipment to derate or stop the powertrain 23.

Figure 3:
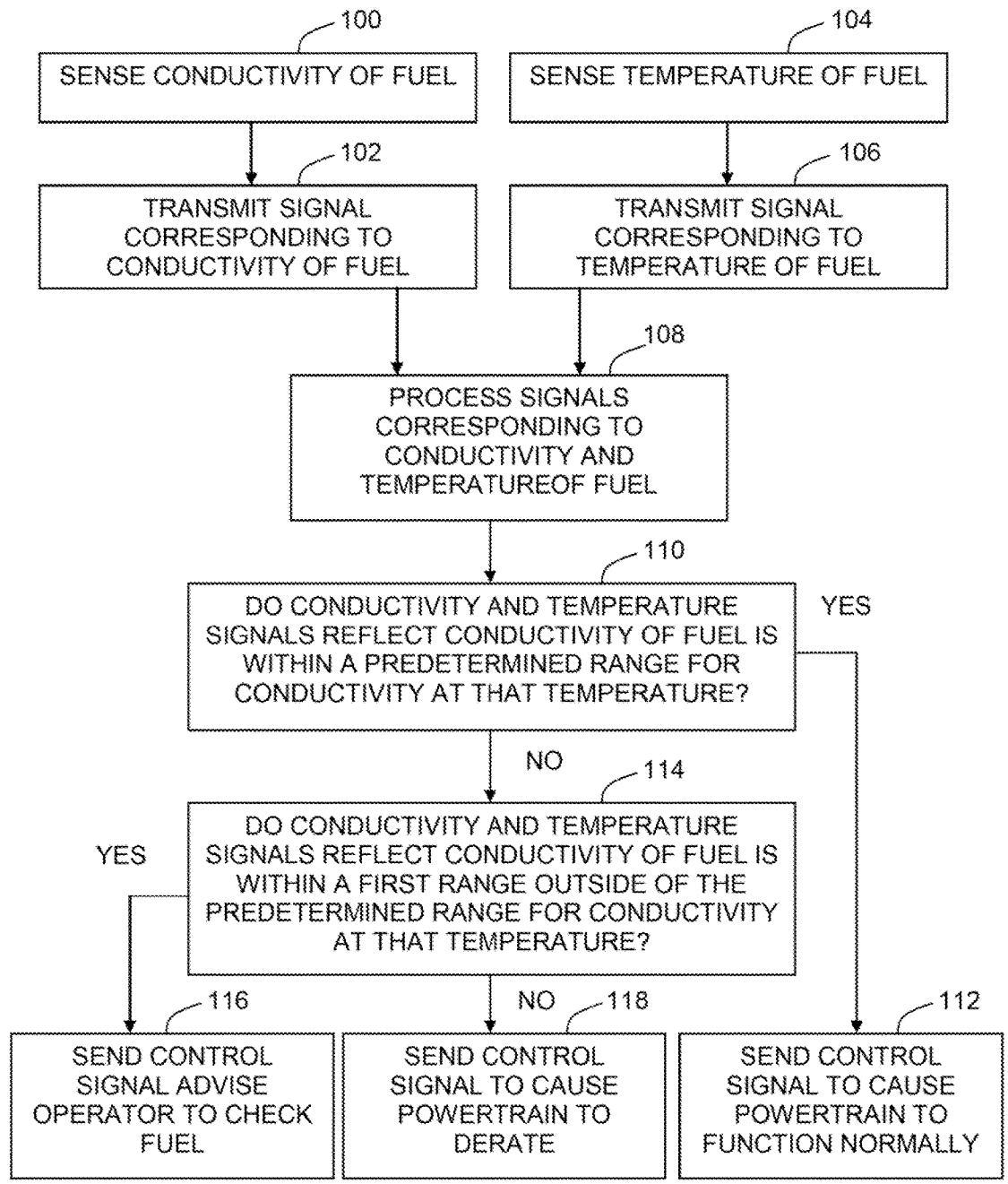
FIG. 3 is a flow chart of a method for operating a powertrain according to an aspect of the present invention.

A flowchart illustrating steps in a method of operating a powertrain arrangement 21 for use with additized Dimethyl Ether (DME) fuel according to an aspect of the present invention is shown in FIG. 3. At step 100, conductivity of fuel (for example, in a fuel tank 29) is sensed with a conductivity sensor 31 in the fuel tank and, at step 102, a signal corresponding to the conductivity of fuel sensed by the conductivity sensor is transmitted. At the same time, at step 104, temperature of the fuel is sensed with a temperature sensor 33 and, at step 106, a signal corresponding to the temperature of the fuel sensed by the temperature sensor is transmitted. At step 108, the conductivity signal and the temperature signal are processed in the controller 35 and a control signal is sent via the controller to control functioning of a powertrain 23 of the powertrain arrangement 21 in response to the conductivity signal and the temperature signal.

At step 110, it is determined if the conductivity signal and the temperature signal reflect that the conductivity of the fuel at the temperature of the fuel is within a predetermined range. If so, the controller 35 can send a control signal to cause the powertrain 23 to function normally at step 112. When the conductivity signal and the temperature signal reflect that the conductivity of the fuel at the temperature of the fuel is outside of the predetermined range, the controller 35 can send a control signal to cause the powertrain 23 to at least one of derate and shut down. Different control signals can be sent as a function of an extent to which the conductivity of the fuel at the temperature of the fuel is outside of the predetermined range. For example, when it is determined at step 114 that the conductivity of the fuel at the temperature of the fuel is within a first range outside of the predetermined range (the first range typically reflecting fuel quality that will not cause catastrophic engine failure if not immediately addressed), a first control signal to cause a warning signal to check the fuel can be sent at step 116. For example, the first control signal to cause a warning signal to be sent to check the fuel might be sent at step 116 when conductivity is between the curves "1$^{st}$ Warning Band" and "2$^{nd}$ Warning Band" on either side of the DME curve in FIG. 2. A second control signal to cause the powertrain to derate might be sent at step 118 when conductivity is above the upper curves "2$^{nd}$ Warning Band" and below the lower curve "2$^{nd}$ Warning Band". A further control signal to cause the powertrain to shut down can be sent if, for example, conductivity is outside of a further range (not shown) beyond the "2$^{nd}$ Warning Bands". It will be appreciated that the ranges and responses discussed above in connection with FIG. 2 are merely illustrative ranges and responses and that the ranges may be set differently than described herein, and the responses to determinations that the conductivity is in a particular range may be different from the responses described herein.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A powertrain arrangement for use with additized Dimethyl Ether (DME) fuel, the additized DME comprising DME and a lubricity additive, comprising:
    a powertrain comprising an engine adapted for use with the additized DME fuel;
    a fuel tank;
    a conductivity sensor in the fuel tank, the conductivity sensor being arranged to transmit a signal corresponding to a conductivity of fuel in the fuel tank;
    a temperature sensor in the fuel tank, the temperature sensor being arranged to transmit a signal corresponding to a temperature of the fuel in the fuel tank; and
    a controller configured to receive and process the conductivity signal and the temperature signal and to send a control signal to control functioning of the powertrain in response to the conductivity signal and the temperature signal, and wherein the controller is configured to send a control signal to cause the powertrain to derate without stopping supply of fuel to the engine when the conductivity signal and the temperature signal reflect that the conductivity of the fuel in the fuel tank at the temperature of the fuel in the fuel tank is within a first predetermined range.

2. The powertrain arrangement as set forth in claim 1, wherein the controller is configured to send a control signal to cause the powertrain to function normally when the conductivity signal and the temperature signal reflect that the conductivity of the fuel in the fuel tank at the temperature of the fuel in the fuel tank is within a second predetermined range.

3. The powertrain arrangement as set forth in claim 2, wherein the controller is configured to at least one of send a warning signal to check fuel, cause the powertrain to derate, and cause the powertrain to shut down when the conductivity signal and the temperature signal reflect that the conductivity of the fuel in the fuel tank at the temperature of the fuel in the fuel tank is outside of the second predetermined range.

4. The powertrain arrangement as set forth in claim 1, wherein the controller is configured to send a control signal to at least one of send a warning signal to check fuel, cause the powertrain to derate, and cause the powertrain to shut down when the conductivity signal and the temperature signal reflect that the conductivity of the fuel in the fuel tank at the temperature of the fuel in the fuel tank is outside of a second predetermined range.

5. The powertrain arrangement as set forth in claim 4, wherein the controller is configured to send different control signals as a function of an extent to which the conductivity of the fuel in the fuel tank at the temperature of the fuel in the fuel tank is outside of the second predetermined range.

6. The powertrain arrangement as set forth in claim 5, wherein the controller is configured to send a first control signal to send a warning signal to check fuel when the conductivity of the fuel in the fuel tank at the temperature of the fuel in the fuel tank is within a first range outside of the second predetermined range.

7. The powertrain arrangement as set forth in claim 6, wherein the controller is configured to send a second control signal to cause the powertrain to derate without stopping supply of fuel to the engine when the conductivity of the fuel in the fuel tank at the temperature of the fuel in the fuel tank is outside the first range outside of the second predetermined range.

8. An apparatus for measuring conductivity of additized Dimethyl Ether (DME) fuel, the additized DME comprising DME and a lubricity additive, comprising:
    a conductivity sensor, the conductivity sensor being arranged to transmit a signal corresponding to a conductivity of fuel being measured;
    a temperature sensor, the temperature sensor being arranged to transmit a signal corresponding to a temperature of the fuel being measured; and
    a controller configured to receive and process the conductivity signal and the temperature signal and to send a signal in response to a determination that conductivity of the fuel being measured is outside of a predetermined range of conductivity for additized DME at the temperature of the fuel being measured, the predetermined range of conductivity for additized DME at the temperature of the fuel being measured reflecting at least one of contamination of the fuel being measured and presence of insufficient lubricity additive.

9. A method of operating a powertrain arrangement for use with additized Dimethyl Ether (DME) fuel, the additized DME comprising DME and a lubricity additive, comprising:
    sensing conductivity of fuel with a conductivity sensor;
    transmitting a signal corresponding to the conductivity of the fuel sensed by the conductivity sensor;
    sensing a temperature of the fuel with a temperature sensor;
    transmitting a signal corresponding to the temperature of the fuel sensed by the temperature sensor; and processing the conductivity signal and the temperature signal in a controller and sending via the controller a control signal to control functioning of a powertrain of the powertrain arrangement in response to the conductivity signal and the temperature signal including at least sending a control signal to cause the powertrain to derate without stopping supply of fuel to the engine when the conductivity signal and the temperature signal reflect that the conductivity of the fuel in the fuel tank at the temperature of the fuel in the fuel tank is within a first predetermined range.

10. The method as set forth in claim 9, comprising sending a control signal to cause the powertrain to function normally when the conductivity signal and the temperature signal reflect that the conductivity of the fuel at the temperature of the fuel is within a second predetermined range.

11. The method as set forth in claim 10, comprising sending a control signal to at least one of send a warning signal to check fuel, cause the powertrain to derate, and cause the powertrain to shut down when the conductivity signal and the temperature signal reflect that the conductivity of the fuel at the temperature of the fuel is outside of the second predetermined range.

12. The method as set forth in claim 9, comprising sending a control signal to at least one of send a warning signal to check fuel, cause the powertrain to derate, and cause the powertrain to shut down when the conductivity signal and the temperature signal reflect that the conductivity of the fuel at the temperature of the fuel is outside of a second predetermined range.

13. The method as set forth in claim 12, comprising sending different control signals as a function of an extent to which the conductivity of the fuel at the temperature of the fuel is outside of the second predetermined range.

14. The method as set forth in claim 13, comprising sending a first control signal to send a warning signal to check fuel when the conductivity of the fuel at the temperature of the fuel is within a first range outside of the second predetermined range.

15. The method as set forth in claim 14, comprising sending a second control signal to cause the powertrain to derate without stopping supply of fuel to the engine when the conductivity of the fuel at the temperature of the fuel is outside the first range outside of the second predetermined range.

\* \* \* \* \*